Nov. 14, 1972    U. STORB ET AL    3,702,748
APPARATUS FOR THE PRODUCTION OF PELLETS FROM A MELT
Filed Aug. 3, 1970                2 Sheets-Sheet 1

Inventors
UWE STORB
HERBERT KAISER
GÜNTER KAISER
By Ostrolenk, Faber, Gerb & Soffen
ATTORNEYS

United States Patent Office 3,702,748
Patented Nov. 14, 1972

3,702,748
APPARATUS FOR THE PRODUCTION OF
PELLETS FROM A MELT
Uwe Storb, Krefeld, and Herbert Kaiser and Gunter Kaiser, Krefeld-Uerdingen, Germany, assignors to Gebr. Kaiser, Maschinenfabrik, Krefeld-Uerdingen, Germany
Filed Aug. 3, 1970, Ser. No. 60,378
Claims priority, application Germany, Aug. 16, 1969,
P 19 41 460.9
Int. Cl. B29c 23/00
U.S. Cl. 425—6  8 Claims

ABSTRACT OF THE DISCLOSURE

For producing pellets from liquid material the liquid is placed in a vessel with at least one nozzle in its bottom. In order to aid flow of liquid from the nozzle a vertically reciprocating plunger or needle is provided above the nozzle orifice.

BACKGROUND OF INVENTION (1) Field to which invention relates

The present invention relates to methods and apparatus for the production of pellets or granules and more particularly to the production of pellets from molten material in a vessel or ladle provided with one or more nozzles in its bottom which is or are provided with a vertically moving needle leaving an annular gap between it and the nozzle wall into which the molten material flows and then flows on a moving cooling surface for the purpose of solidifying.

(2) The prior art

There has already been a prior proposal to provide nozzles with plungers or rods in them so for aiding the flow and distribution of the molten material so as to form individual pellets. In accordance with a further prior proposal a vertically reciprocating plunger was to be provided with a small clearance in a nozzle so as to open the nozzle for the passage of melt when it moved upwards and closed it again on moving downwards in order to eject the molten material. In this respect there is more particularly the disadvantage that the abrasion of metal occurring owing to friction between the piston or plunger and the nozzle opening can bring about contamination of the product to be produced. Furthermore in the case of the method mentioned the number of granules or pellets produced in a given period of time and the size of the granules are always comparatively small.

SUMMARY OF INVENTION

The present invention provides a method for producing pellets from molten material, comprising placing the material in a vessel, and allowing it to flow through at least one nozzle in the bottom of the vessel on to a generally horizontally moving cooling surface for the purpose of solidifying, the material flowing into a relative pressure space at an outlet zone of the nozzle, the relative pressure space discharging on the one hand by a defined flowing out and separation of a pre-determined volume of molten material and on the other hand by return flow of molten material along a needle into the vessel for molten material, the needle being vertically aligned with the nozzle and moving upwards and downwards.

In accordance with a preferred form of the invention there is the provision that the nozzle is provided with a part of reduced diameter to form the pressure space, an end face of the needle being arranged to reciprocate adjacent to the part of reduced diameter.

Further preferred forms of the invention will be found in the claims.

The measures provided in accordance with the invention can be advantageously applied in the context of a method and an apparatus for the production of granules, see for example the British patent specification 329,652, in which a plunger or piston is moved in a nozzle upwards and downwards with a small clearance. The invention thus relates also to such a method and apparatus and provides in it the same measures as in the case of the method and apparatus mentioned initially. In particular the invention provides a nozzle which is preferably of reduced diameter at its exit end.

LIST OF SEVERAL VIEWS OF DRAWINGS

Further advantages and details of the invention will be gathered from the following description referring to the accompanying drawing.

DESCRIPTION OF PREFERRED EMBODIMENTS

Figure 1:
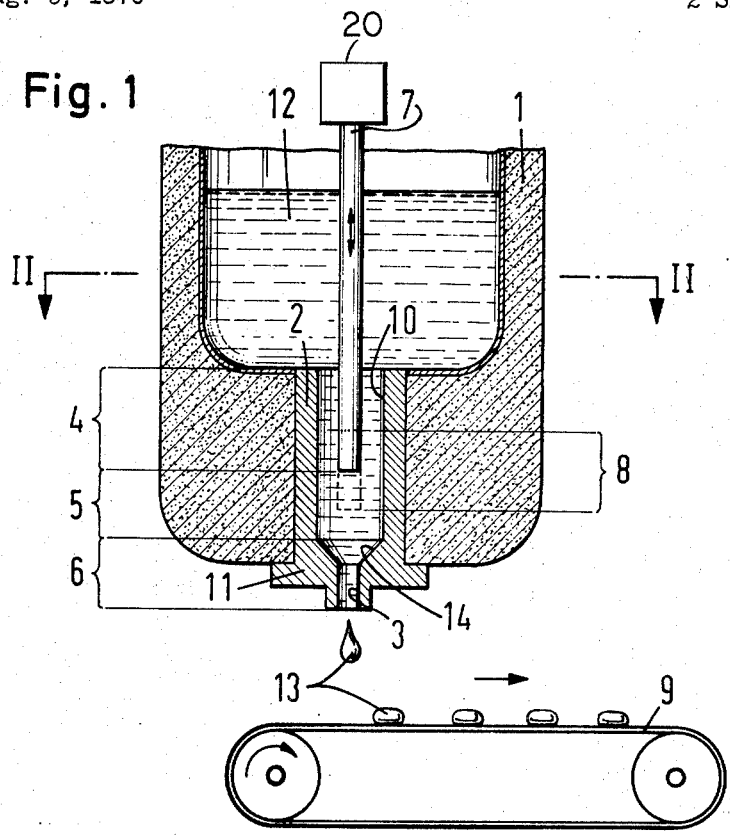
FIG. 1 is a cross-section through a vessel or ladle for holding molten material embodying the invention.
Figure 2:
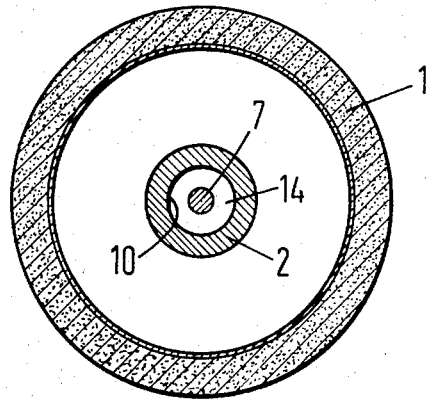
FIG. 2 is a view along the line II—II of FIG. 1.

At the bottom of a ladle 1 as shown in FIGS. 1 and 2 at least one nozzle 2 is provided; however, preferably several such nozzles 2 are provided so as to be adjacent to each other. In accordance with the invention the nozzle bore or hole 10 is provided at its outlet end 11 with a part 6 of reduced diameter which is made up in turn of a cylindrical part 3 of reduced diameter and a transition part 14 of reduced diameter. The whole nozzle 2 can therefore to be considered as being made up of three zones, that is to say zone 4 for the flowing-in and sucking-in of the melt 12, a zone 5 for a relative pressure build up, and a pinched or tapered zone 6, denoted by the same reference numeral as the pinched part 6, for flow out of material in a quantity necessary for forming a pellet body 13.

The diameter of the nozzle bore 10 in the zones 4 and 5 and in the flow out zone 6 is arrived at in accordance with the viscosity of the products to be pelletised. The same applies for the lengths of the zones 4, 5, 6 as a function of the diameter of the vertically reciprocating needle 7 in the zones 4 and 5. Also the stroke 8 and the clearance in the zone 5 between the lower end face of the needle 7 and the pinched part 6 of the nozzle are arrived at in accordance with the viscosities of the products to be processed.

Preferably the diameter of the actual pinched out part is less than the diameter of the needle 7 so that in the nozzle out flow zone 11 there is a defined flow. This leads to an even formation and deposit of the granules on a cooling face.

Tests have shown that the pinched out part or zone 6 can have a length between 0.5 and 30 mm. in accordance with the type of product to be pelletised. An important factor for a high rate of granulation and the formation and deposit of well-formed granules on the belt-like cooling face—for example the cooling belt 9—is, however, the tapered part 6 arranged at the nozzle exit end 11, above which the plunger or needle 7 reciprocates vertically.

In the construction shown in FIGS. 1 and 2 the nozzle bore 10 is cylindrical in the zones 4 and 5. Also the tapering part 3 is circular in cross-section, the transition from the zone 5 to the actual tapering part 3 having the form of a frusto-cone 14 in the embodiment of FIG. 1. Furthermore the needle is also cylindrical in construction and its lower circular end face cooperates with tapered part 6. The needle 7 is caused to reciprocate vertically by any suitable means 20. Means 20 also permits adjustment of the frequency of movement of needle 7. The nozzle and needle cross-section can, however, be not only cylindrical but also oval, square, rectangular or be in other shapes.

Figure 3:
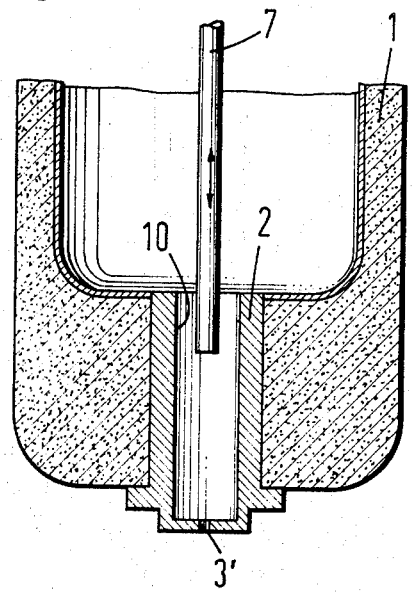
FIG. 3 is a cross-section through a further embodiment of the nozzle and the ladle in accordance with the invention.
Figure 4:
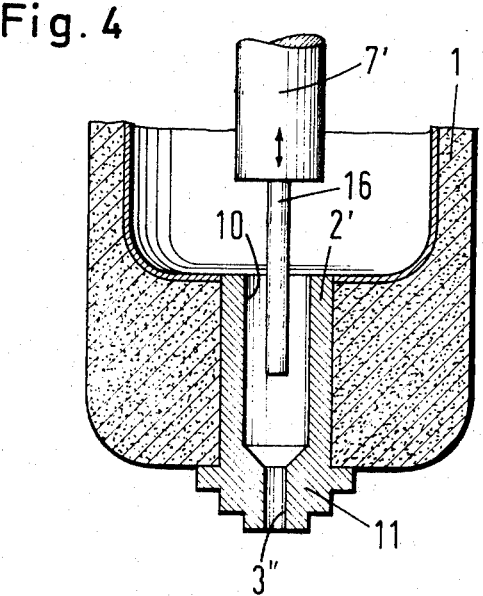
FIG. 4 is a further section through a nozzle and ladle constructed in accordance with the invention.

Furthermore there is the possibility for making the transitional part from the zone 5 to the actual tapering part 3 in the form of a rectangular transition part leading to the actual taper part 3. This is shown in FIG. 3. In FIG. 4 a further possibility as regards the construction of the needle 7 is shown. The needle, denoted by reference numeral 7', is of reduced diameter at its lower end 16 and the latter moves as far as the tapered part 3''.

As already mentioned the needle or plunger 7, 7' is moved in the nozzle 2 upwards and downwards and its diameter depends upon the viscosity of the product. The molten material 12 or melt flows into the extended gap between the nozzle inlet and the needles 7, 7'' and is propelled by a hydrostatic pressure, possibly supplemented by an additional pressure. It is also propelled by the energy of the downwardly movement of the needle 7. The hydrostatic pressure can be increased by increasing the degree of filling of the vessel containing the molten material.

The downward movement of the needle or plunger 7, 7' produces between the tapered part 6 of the nozzle 2 at its outlet end and the end face of the needle 7 a transient zone of relatively high pressure, so that a part of the melt 12 is provided with an extra force tending to be ejected from the nozzle. This leads to a substantial increase in size of the granules or pellets and/or the number of granules produced by unit time as compared with known methods and apparatus.

The narrowed part 6 in accordance with the invention is also capable of being used in an apparatus in which a piston is mounted in the nozzle with a small degree of clearance and moves upwards and downwards in order to eject the molten material in drops. In this manner in the case of this apparatus as well a larger rate of production of granules or pellets is attained and there may also, or as an alternative, be an improved shaping of the pellets.

It is further pointed out that the needle or plunger 7 can be in any convenient shape more particularly with the purpose of improving the construction of the space of relatively high pressure.

Finally it is pointed out that the nozzle part in the tapering zone 6 is in the form of nozzle elements of different size.

In accordance with the invention the tapering zone or part 6 can also be arranged at any suitable part in the nozzle, there being further downstream a zone which widens.

What we claim is:

1. An apparatus for producing pellets from molten material and for delivering the pellets to a relatively moving cooling surface provided for receiving the pellets, said apparatus comprising:

a vessel for holding molten materials; a nozzle having walls defining a first cross-sectional area; said nozzle communicating with said vessel at a location in said vessel such that material moves from said vessel into said nozzle; said nozzle having an outlet of reduced cross-sectional area smaller than said first cross-sectional area; said nozzle being oriented such that material moves out through said nozzle;

a reciprocable needle positioned within said nozzle and outside said nozzle outlet; said needle having a cross-sectional area less than said first cross-sectional area, being oriented to be reciprocated toward and away from said nozzle outlet and having a pathway of reciprocation moving it near to but not into said nozzle outlet; said nozzle thereby always being open; means for reciprocating said needle;

whereby the reciprocation of said needle toward said nozzle produces a relative increased pressure in said nozzle above said outlet, which pressure discharges by defined outflow and separation of a predetermined volume of molten material through said outlet and by return flow along said needle into said vessel.

2. An apparatus in accordance with claim 1, wherein said needle is so positioned as to be out of contact with said nozzle walls.

3. An apparatus in accordance with claim 1 in which said reciprocation means is adjustable so that the frequency of movement of the needle is adjustable.

4. An apparatus in accordance with claim 1 in which said reciprocation means is adjustable so that the stroke of the needle is adjustable.

5. An apparatus in accordance with claim 1 in which said needle has a lower end face; the distance between said lower end face of said needle and said nozzle outlet is adjustable by adjustment of said reciprocation means.

6. An apparatus in accordance with claim 1 in which said nozzle is joined to said nozzle outlet by a section of said nozzle converging toward said outlet.

7. An apparatus in accordance with claim 1 in which the transition between said nozzle and said outlet is rectangular.

8. An apparatus in accordance with claim 1 in which there is a section of said nozzle with a greater cross-sectional area after said nozzle outlet.

References Cited

UNITED STATES PATENTS

| | | | |
|---|---|---|---|
| 3,341,087 | 9/1967 | Rosin et al. | 18—2.7 X |
| 3,208,101 | 9/1965 | Kaiser et al. | 18—2.4 |
| 2,566,567 | 9/1951 | Hutchinson et al. | 18—2.4 X |
| 2,790,201 | 4/1957 | Eilbracht et al. | 18—2.4 |
| 2,978,742 | 4/1961 | Bliemeister | 18—2.4 X |
| 3,457,335 | 7/1969 | Elliott | 264—13 |

ROBERT L. SPICER, JR., Primary Examiner

U.S. Cl. X.R.

264—13; 222—420